Oct. 25, 1966     R. A. FINDLAY     3,281,250
MILK CRYSTALLIZATION PROCESS
Filed March 12, 1964
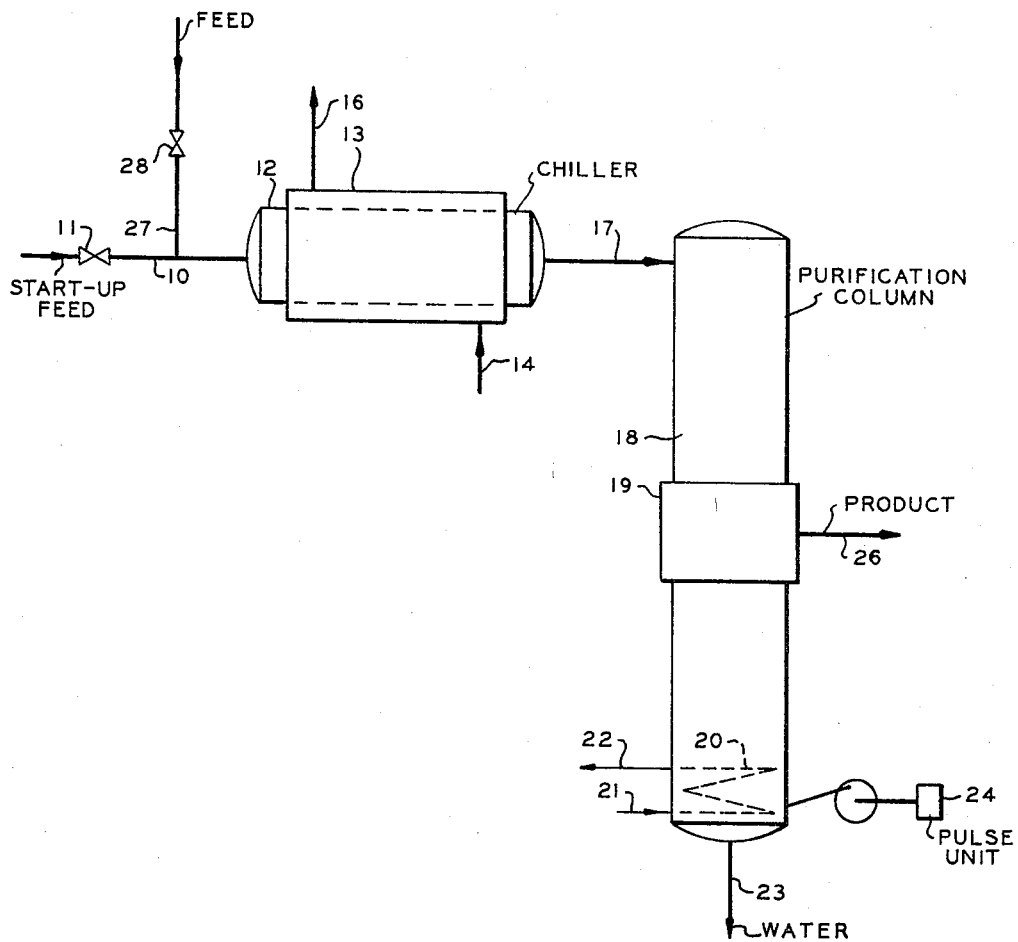
INVENTOR.
R. A. FINDLAY
BY *Young + Quigg*
ATTORNEYS

United States Patent Office 3,281,250
Patented Oct. 25, 1966

3,281,250
MILK CRYSTALLIZATION PROCESS
Robert A. Findlay, Bartlesville, Okla., assignor to Phillips Petroleum Company, a corporation of Delaware
Filed Mar. 12, 1964, Ser. No. 351,477
7 Claims. (Cl. 99—200)

This invention relates to a method and apparatus for concentrating milk by crystallization. In another aspect, this invention relates to a milk crystallization start-up method and apparatus therefor wherein a butter fat-free aqueous liquid is initially introduced into the crystal forming, crystal separation and crystal melt zones.

Conventionally, aqueous solutions can be concentrated by crystallization involving chilling the aqueous solution to form ice crystals followed by separation of the ice crystals from the mother liquor. This method as applied to the concentration of food products has become commercially acceptable, as it can be carried out without damaging the taste of the food product. In this respect, concentration by crystallization represents a considerable improvement over evaporative processes which rely upon heat and/or extremely low pressures. Concentration by crystallization can be employed to advantage in the processing of such food products and beverages as milk, fruit juices, vegetable juices vinegar, beer, wine, liquors, and the like.

A method of concentration by crystallization involves chilling the aqueous solution in a chiller to form a slurry of ice crystals and mother liquor and then forcing the resulting slurry into a crystal purification column such as described in the patent to Schmidt, U.S. Re. 23,810 and the patent to R. W. Thomas, U.S. 2,854,494, and comprising an elongated confined purification or concentration zone. The crystals are moved in a compact mass into a body of crystal melt which is formed by heating the crystals in a downstream portion of the concentration zone. A portion of the crystal melt is displaced back into the advancing crystal mass. The purification column includes an upstream liquid removal zone, a middle reflux zone, and a downstream melting zone. Mother liquor is separated from the crystals in the liquid removal zone and the crystals are melted in the melting zone.

It has been observed that in the concentration of milk by crystallization coagulation of the butter fat upon the formation of ice crystals results in problems in operation of the crystal purification column. Butter fat deposits accumulate around the heat exchange means employed in the melt zone of the crystal purification column resulting in the loss of butter fat, reduced heat transfer and substantially reducing the crystal purification column throughput.

Accordingly, an object of my invention is to provide an improved milk crystallization process and apparatus therefor.

Another object of my invention is to provide a milk crystallization process and apparatus therefor wherein the accumulation of butter fat in the melt zone of the crystal purification column is minimized.

Other objects, advantages and features of my invention will be readily apparent to those skilled in the art from the following description, the drawing and appended claims.

Broadly, my invention comprises initially passing a butter fat-free aqueous liquid feed to a crystal forming zone, forming a slurry comprised of mother liquor and ice crystals therein, separating the mother liquor from the formed ice crystals, passing the separated crystals to a reflux zone, forming a bed of ice crystals within said reflux zone, thereafter withdrawing said butter fat-free aqueous liquid feed, substituting whole milk as feed to said crystal forming zone, passing crystals from said reflux zone into a melt zone, and melting said crystals within said melt zone.

It has been discovered that if the crystallization process is started up on an initial feed of butter fat-free or skim milk until a crystal mass is formed in the purification column and the feed then changed to whole milk, butter fat does not accumulate in the reflux and melt zones. Operating according to the process of my invention eliminates the loss of butter fat in the product milk concentrate and substantially increases the crystal purification column throughput.

The drawing is a schematic representation of one embodiment of the invention.

Referring now to the drawing, a start-up feed comprising a butter fat-free aqueous feed such as water or skim milk is passed via conduit means 10 and valve means 11 into chiller 12. Chiller 12 can comprise a conventional means, such as a scraped surface chiller, for chilling the feed mixture so as to form a slurry comprised of crystals and mother liquor. As illustrated, chiller 12 is surrounded by cooling jacket 13 having a coolant inlet conduit 14 and a coolant outlet conduit 16. Within chiller 12, ice crystals are formed so as to form an ice crystal slurry which contains normally from about 20 to about 60 weight percent solids. While it is desirable to concentrate as much as possible the formation of crystal solids, if the solids content is too high, the slurry becomes quite stiff and becomes too difficult to pass from the chiller.

The slurry of ice crystals comprising crystals and adhering mother liquor is passed from chiller 12 via conduit means 17 to crystal purification column 18. Crystal purification column 18 can be a piston-type column substantially as described in the patent to Schmidt, U.S. Re. 23,810, or a pulse-type column as herein illustrated and described in the patent to R. W. Thomas, U.S. 2,854,494. In either type of column, a compacted mass of crystals is forced through the column; a filter section 19 is provided in an intermediate portion in purification column 18 so that mother liquor can be withdrawn from the column and separated from the crystals; and the compacted mass of crystals is refluxed so the liquid passes countercurrently through the mass of crystals. As illustrated, purification column 18 is provided with a means 20 of heating the crystal mass in the downstream region of the column 18, thereby providing a reflux liquid and providing for the withdrawal of the crystals from the purification column as the liquid melt.

Downstream of the filter section 19, the mass of crystals is refluxed with the liquid passed countercurrently through the mass of crystals as heretofore described. The mass of crystals moves through the reflux zone into the melt zone wherein said crystals are melted by means of a heating medium passed via conduit inlet 21 to heat exchange means 20 and withdrawn from heat exchange means 20 via conduit outlet means 22. A portion of the melted crystals is passed countercurrent to the moving mass of crystals in the heretofore described manner, and the remainder of the melted crystals is withdrawn from the melt zone via conduit means 23. As illustrated, purification column 18 is a pulse-type column having a pulse unit 24.

Mother liquor is separated from the crystals in filtration zone 19. The separated mother liquor is withdrawn from filtration zone 19 via conduit means 26. It is within the scope of this invention to aid the separation of ice crystals and mother liquor in filtration zone 19 by heating the filter within filtration zone 19 as described in copending application Serial No. 298,279, filed July 29, 1963, by S. L. Garrett.

After formation of the crystal mass in the reflux zone, whole milk can be substituted for the butter fat-free aqueous feed passing to chiller 12. Preferably, the whole milk is not substituted for the butter fat-free aqueous feed until at least a portion of the crystal mass has been melted in the melt zone and the crystal mass in the reflux zone refluxed with a portion of the melted crystals. Thus, as illustrated, a whole milk feed is then passed to chiller 12 via conduit means 27, valve means 28 and conduit means 10. Within chiller 12, the whole milk feed is subjected to a chilling step such as described for the start-up feed. The resulting formed ice crystal slurry is passed via conduit means 17 from chiller 12 to purification column 18 wherein the separation of the formed ice crystals and mother liquor is effected as previously described.

A concentrated milk product containing the butter-fat constituents is withdrawn from filtration zone 19 via conduit means 26. By starting the crystallization process on a butter fat-free aqueous feed as previously described, there is no accumulation of butter fat around the heat exchange means 20. As a result, loss of butter fat in the water withdrawn from purification column 18 via conduit means 23 is prevented and maximum crystal purification column throughput is obtained.

The following examples are presented to illustrate the objects and advantages of the invention. It is not intended, however, that the invention should be limited to the specific embodiments disclosed therein.

*Example I*

In this example whole milk was passed as the initial feed and as the continuous feed to the chiller. The whole milk feed contained 11.35 weight percent milk solids. The whole milk was cooled to a temperature of 29.4° F. The formed crystal slurry comprising 48 weight percent ice solids was passed at a rate of 5.75 pounds per hour to the purification column of the drawing. The purification column was a 4-inch diameter column having a purification section length of 11 inches and a filter area of 12.6 inches.

Water at an inlet temperature of 135° F. and at the rate of 35 pounds per hour was passed to the heating coil positioned in the downstream region of the column. The outlet temperature of the water was 127° F. The temperature in the downstream (melt) region of the column was 54° F.

The height of the crystal bed within the column was 3 inches. Water was withdrawn from the downstream region of the column at the rate of 2.75 lb./hr. or 0.33 gallon per hour. Concentrated milk containing 21.78 weight percent solids was recovered from the filtration zone at the rate of 3 pounds per hour.

After a 24-hour run, the column was opened up and it was found that the heating coils were coated with butter fat precipitated from the whole milk feed. It was further observed that the area immediately below the heater was also filled with butter.

*Example II*

In this example, the initial feed to the chiller comprised skimmed milk which was replaced after operation of the purification column was established with whole milk. The skimmed milk was cooled to a temperature of 30.5° F. The formed crystal slurry comprising 45 weight percent ice solids was passed at the rate of 3.2 pounds per hour to the purification column of Example I.

Water at an inlet temperature of 120° F. and at a rate of 21 pounds per hour was passed to the heating coil positioned in the downstream region of the column. The outlet temperature of the water was 91° F. The temperature in the downstream region of the column was 50° F.

Skimmed milk feed was passed to the chiller and from the chiller to the purification column until a 1-inch bed of crystals was established within the purification column and the rate of product water withdrawal from the purification column was 0.38 pound per hour. At this point, whole milk containing 10.5 weight percent milk solids was introduced as feed to the chiller.

After replacing the skimmed feed milk to the chiller, the formed crystal slurry comprising 73.5 weight percent ice solids and whole milk mother liquor was passed at the rate of 5.7 pounds per hour to the purification column.

The temperature of the slurry feed to the purification column was 29° F. Water at an inlet temperature of 120° F. and at the rate of 30 pounds per hour was passed to the heating coil positioned in the downstream region of the column. The heater outlet temperature of the water was 98° F. The temperature in the downstream region of the column was 48° F.

The height of the crystal bed within the column was 3 inches. Water was withdrawn from the downstream region of the column at the rate of 4.2 pounds per hour or 0.50 gallon per hour. Concentrated milk containing 39.8 percent milk solids was recovered from the filtration zone at the rate of 1.5 pounds per hour.

Pressure conditions within the purification zone were maintained substantially the same for the runs in Example I and Example II.

After a 64-hour run, the purification column was opened. Upon examination, it was discovered that the heater coils and the interior of the column showed no evidence of butter fat.

As will be evident to those skilled in the art, various modifications of this invention can be made, or followed, in the light of the foregoing disclosure, without departing from the spirit or scope thereof.

I claim:

1. A process which comprises passing a butter fat-free aqueous liquid of either water or skim milk feed to a crystal forming zone, forming a slurry comprised of mother liquor and ice crystals within said crystal forming zone, passing said slurry from said crystal forming zone to a purification zone, separating said mother liquor from said ice crystals in said purification zone, forming a bed of ice crystals within said purification zone, thereafter withdrawing said butter fat-free aqueous liquid feed to said crystal forming zone, and substituting whole milk for said butter fat-free aqueous liquid as feed to said crystal forming zone.

2. The process of claim 1 to include melting said ice crystals in a downstream region of said purification zone, and withdrawing melted ice crystals from said purification zone.

3. The process of claim 2 to include refluxing said crystals in said purification zone.

4. The process of claim 3 wherein said butter fat-free aqueous liquid comprises skim milk.

5. A process which comprises passing a butter fat-free aqueous liquid of either water or skim milk feed to a crystal forming zone, forming a slurry comprised of mother liquor and ice crystals within said crystal forming zone, passing said slurry from said forming zone to a purification zone, separating said mother liquor from said ice crystals within said purification zone, withdrawing the separated mother liquor from said purification zone, melting the separated crystals in a downstream region of said purification zone, withdrawing melted crystals from said purification zone, thereafter withdrawing said butter fat-free aqueous liquid feed, and substituting whole milk feed for said butter fat-free aqueous liquid as feed to said crystal forming zone.

6. A process which comprises passing a butter fat-free aqueous liquid of either water or skim milk feed to a crystal forming zone, forming a slurry comprised of mother liquor and ice crystals within said crystal forming zone, passing said slurry from said crystal forming zone to a purification zone, separating said mother liquor from said ice crystals within said purification zone, withdrawing said mother liquor from said purification zone, refluxing the separated crystals within said purification zone, melting said separated and refluxed crystals in a downstream region of said purification zone, withdrawing said melted crystals from said purification zone, thereafter withdrawing said butter fat-free aqueous liquid feed, and substituting whole milk for said butter fat-free aqueous liquid as feed to said crystal forming zone.

7. The process of claim 6 wherein said butter fat-free aqueous liquid feed comprises skim milk.

References Cited by the Examiner

UNITED STATES PATENTS

| 2,891,099 | 6/1959 | Skinner | 99—200 X |
| 3,212,281 | 10/1965 | McKay | 62—58 |

A. LOUIS MONACELL, *Primary Examiner.*

L. M. SHAPIRO, *Assistant Examiner.*